United States Patent
Dawson

(10) Patent No.: US 10,979,616 B2
(45) Date of Patent: Apr. 13, 2021

(54) WIRELESS COMMUNICATION BETWEEN A LENS ASSEMBLY AND A CAMERA

(71) Applicant: Sony Corporation, Tokyo (JP)

(72) Inventor: Thomas Dawson, Escondido, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/204,916

(22) Filed: Nov. 29, 2018

(65) Prior Publication Data

US 2020/0177790 A1 Jun. 4, 2020

(51) Int. Cl.
*H04N 5/232* (2006.01)

(52) U.S. Cl.
CPC ..... *H04N 5/23206* (2013.01); *H04N 5/23225* (2013.01)

(58) Field of Classification Search
CPC ............... H04N 5/23206; H04N 5/23225
See application file for complete search history.

(56) References Cited

U.S. PATENT DOCUMENTS

| | | | |
|---|---|---|---|
| 8,040,381 B2 * | 10/2011 | Yumiki | H04N 5/23258 348/208.5 |
| 9,699,363 B2 | 7/2017 | Imamura et al. | |
| 2007/0065129 A1 * | 3/2007 | Shiratori | G03B 17/00 396/55 |
| 2007/0147815 A1 | 6/2007 | Tanaka | |
| 2011/0157461 A1 * | 6/2011 | Tanaka | G02B 7/102 348/373 |
| 2013/0258186 A1 * | 10/2013 | Korekuni | G03B 17/14 348/374 |
| 2014/0152777 A1 | 6/2014 | Galor et al. | |
| 2014/0320736 A1 * | 10/2014 | Tomita | G03B 13/36 348/353 |
| 2016/0212349 A1 * | 7/2016 | Imada | H04N 5/23287 |
| 2017/0289430 A1 * | 10/2017 | Seki | H04N 5/2254 |

* cited by examiner

*Primary Examiner* — Gevell V Selby
(74) *Attorney, Agent, or Firm* — Trellis IP Law Group, PC

(57) ABSTRACT

Implementations generally relate to communication between a lens assembly and a camera. In some implementations, a method includes establishing electronic communication between a lens assembly and a camera, wherein the lens assembly is removably attached to the camera. The method further includes exchanging capability information between the lens assembly and the camera, wherein the capability information includes one or more functional features. The method further includes matching one or more of the functional features that both the lens assembly has and that the camera has. The method further includes enabling the lens assembly and the camera to cooperate in providing functional features based at least in part on the matching of one or more of the functional features.

20 Claims, 5 Drawing Sheets

WIRELESS COMMUNICATION BETWEEN A LENS ASSEMBLY AND A CAMERA

BACKGROUND

Digital cameras capture and record images using digital technology, which enables users to edit photographs and easily share photographs. A digital camera may have an integrated camera lens, which enables the camera to closely control the operations of the lens. Some digital cameras can be used with an interchangeable lens system, which does not have the same degree of control as with an integrated lens.

SUMMARY

Implementations generally relate to communication between a lens assembly and a camera. In some implementations, a system includes one or more processors, and includes logic encoded in one or more non-transitory computer-readable storage media for execution by the one or more processors. When executed, the logic is operable to cause the one or more processors to perform operations including establishing electronic communication between a lens assembly and a camera, where the lens assembly is removably attached to the camera; exchanging capability information between the lens assembly and the camera, wherein the capability information includes one or more functional features; matching one or more of the functional features that both the lens assembly has and that the camera has; and enabling the lens assembly and the camera to cooperate in providing functional features based at least in part on the matching of one or more of the functional features.

With further regard to the system, in some implementations, the logic when executed is further operable to cause the one or more processors to perform operations including establishing the electronic communication between the lens assembly and the camera wirelessly. In some implementations, the one or more functional features include an image focusing function. In some implementations, the one or more functional features include a motion stabilization function. In some implementations, the logic when executed is further operable to cause the one or more processors to perform operations including controlling, by the lens assembly, one or more of the functional features of the camera. In some implementations, the logic when executed is further operable to cause the one or more processors to perform operations including enabling, by the lens assembly, the camera to control one or more of the functional features of the lens assembly. In some implementations, the logic when executed is further operable to cause the one or more processors to perform operations including: entering an update mode; establishing an Internet communication; and receiving one or more of a firmware update and a software update.

In some embodiments, a non-transitory computer-readable storage medium with program instructions thereon is provided. When executed by one or more processors, the instructions are operable to cause the one or more processors to perform operations including establishing electronic communication between a lens assembly and a camera, where the lens assembly is removably attached to the camera; exchanging capability information between the lens assembly and the camera, where the capability information includes one or more functional features; matching one or more of the functional features that both the lens assembly has and that the camera has; and enabling the lens assembly and the camera to cooperate in providing functional features based at least in part on the matching of one or more of the functional features.

With further regard to the computer-readable storage medium, in some implementations, the instructions when executed are further operable to cause the one or more processors to perform operations including establishing the electronic communication between the lens assembly and the camera wirelessly. In some implementations, the one or more functional features include an image focusing function. In some implementations, the one or more functional features include a motion stabilization function. In some implementations, the instructions when executed are further operable to cause the one or more processors to perform operations including controlling, by the lens assembly, one or more of the functional features of the camera. In some implementations, the instructions when executed are further operable to cause the one or more processors to perform operations including enabling, by the lens assembly, the camera to control one or more of the functional features of the lens assembly. In some implementations, the instructions when executed are further operable to cause the one or more processors to perform operations including: entering an update mode; establishing an Internet communication; and receiving one or more of a firmware update and a software update.

In some implementations, a method includes establishing electronic communication between a lens assembly and a camera, where the lens assembly is removably attached to the camera. The method further includes exchanging capability information between the lens assembly and the camera, where the capability information includes one or more functional features. The method further includes matching one or more of the functional features that both the lens assembly has and that the camera has. The method further includes enabling the lens assembly and the camera to cooperate in providing functional features based at least in part on the matching of one or more of the functional features.

With further regard to the method, in some implementations, the method further includes establishing the electronic communication between the lens assembly and the camera wirelessly. In some implementations, the one or more functional features include an image focusing function. In some implementations, the one or more functional features include a motion stabilization function. In some implementations, the method further includes controlling, by the lens assembly, one or more of the functional features of the camera. In some implementations, the method further includes enabling, by the lens assembly, the camera to control one or more of the functional features of the lens assembly.

A further understanding of the nature and the advantages of particular implementations disclosed herein may be realized by reference of the remaining portions of the specification and the attached drawings.

DETAILED DESCRIPTION

Implementations described herein facilitate communication between a lens assembly and a camera. Implementations enable and facilitate the lens assembly and a camera closely interrelating and cooperating in order to provide quality images.

In various implementations, a system establishes electronic communication between a lens assembly and a camera, where the lens assembly is removably attached to the camera (e.g., can be detached from the camera). In various implementations, electronic communication may be achieved via any suitable wireless protocol such as Bluetooth, Wi-Fi, etc. The system exchanges capability information between the lens assembly and the camera, where the capability information includes one or more functional features. The system matches one or more of the functional features that both the lens assembly has and that the camera has. This enables functional capabilities of the lens assembly to compliment and coordinate with the capabilities of the camera. The system then enables the lens assembly and the camera to cooperate in providing functional features based at least in part on the matching of one or more of the functional features. Such features may include, for example, enhanced focus, extended camera modes, motion stabilization, etc. In some implementations, the lens assembly may access and download updated versions of firmware and/or software via the Internet.

Figure 1:
FIG. 1 illustrates a block diagram of an example camera assembly, according to some implementations.

FIG. 1 illustrates a block diagram of an example camera assembly 100, according to some implementations. As shown, camera assembly 100 includes a lens assembly 102 and a camera body, or camera 104. Further aspects of camera assembly 100 are described below in connection with FIG. 2, for example.

Figure 2:
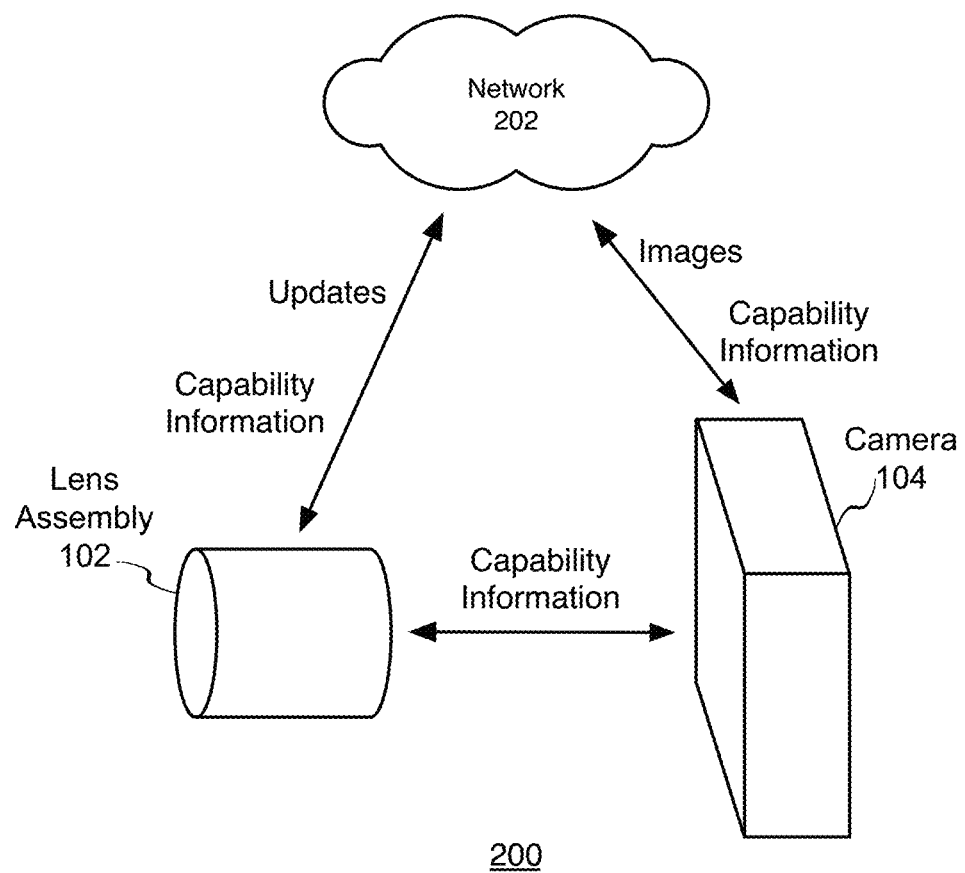
FIG. 2 illustrates a block diagram of an example camera environment, according to some implementations.

FIG. 2 illustrates a block diagram of an example camera environment 200, according to some implementations. As shown, camera environment 200 includes lens assembly 102, camera 104, and a network 202. In other implementations, camera environment 200 may not have all of the components shown and/or may have other elements including other types of elements instead of, or in addition to, those shown herein. For example, each of lens assembly 102 and camera 104 has its own internal electronics, including a processor, memory, etc. (not shown in FIG. 2, but shown in FIG. 5, as an example implementation). Because lens assembly 102 has its own electronics, lens assembly 102 can exchange various types of information (e.g., identity information, capability information, firmware and software information, etc.) with camera 104.

In various implementations, lens assembly 102 is removably attachable to camera 104. As such, lens assembly 102 is interchangeable and may be swapped with another lens assembly (e.g., different size, different functional features, etc.).

As described in more detail herein, lens assembly 102 and camera 104 may exchange functional capability information with each other via any wireless means described herein. For example, network 202 may represent any network through which lens assembly 102 and camera 104 may communicate with each other. Network 202 may be a Wi-Fi network, the Internet, etc. In some implementations, lens assembly 102 and camera 104 communicate wirelessly via other wireless protocols such as Bluetooth, near field communication (NFC), etc. In some implementations, lens assembly 102 may also access and receive firmware and/or software updates via network 202. Also, camera 104 may access the Internet to send images that have been captured.

In the various implementations described herein, lens assembly 102 and camera 104 may perform implementations described herein individually or in combination with each other and/or with other devices. Also, a processor of lens assembly 102 and/or a processor of camera 104 causes the elements described herein (e.g., capability information, update information, etc.) to be exchanged between lens assembly 102, camera 104, and/or the Internet. The system may also cause such information to be displayed in a user interface on one or more display screens associated with lens assembly 102 and/or camera 104.

Figure 3:
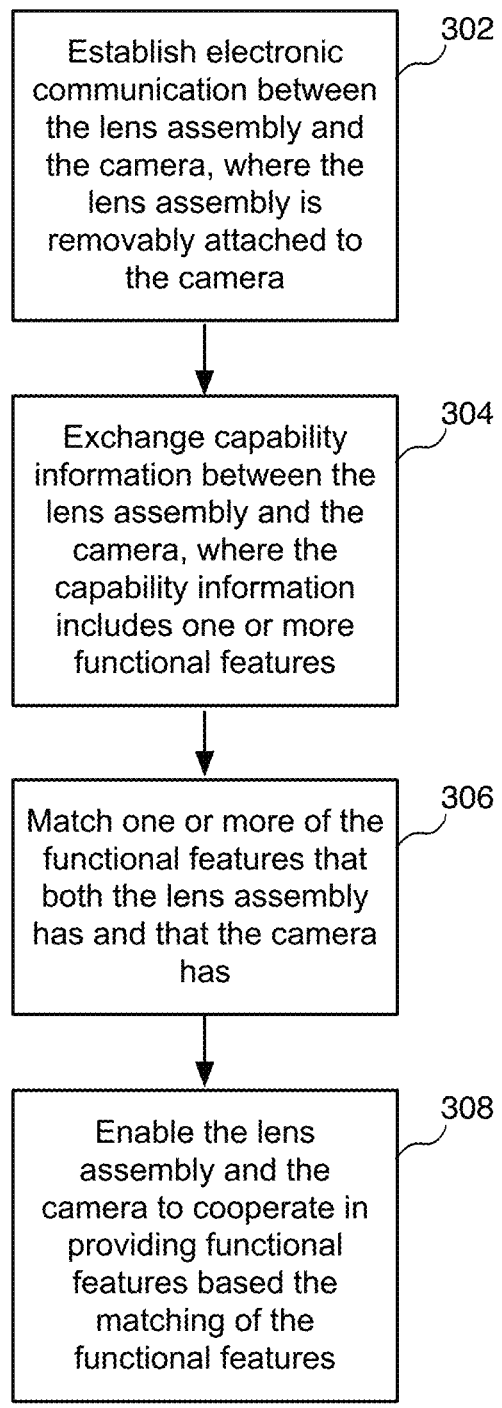
FIG. 3 illustrates an example flow diagram for facilitating communication between a lens assembly and a camera, according to some implementations.

FIG. 3 illustrates an example flow diagram for facilitating communication between a lens assembly and a camera, according to some implementations. As described in more detail herein, implementations enable the lens assembly and a camera to closely cooperate and to interrelate their common functionality in order to provide quality photos. Referring to both FIGS. 2 and 3, a method is initiated at block 302, where the system establishes electronic communication between lens assembly 102 and camera 104. In various implementations, lens assembly is removably attached to camera. As indicated above, a wireless communication link and protocol may be used to set up communication between lens assembly 102 and camera body 104. In some implementations, lens assembly and camera exchange identity information with each other. As indicated above, lens assembly 102 has its own electronics, including a processor. Also, camera 104 has its own electronics, including a processor. This enables both devices to exchange the various types of information described herein.

In various implementations, the system establishes the electronic communication between the lens assembly and the camera wirelessly. As indicated above, wireless communication between lens assembly 102 and camera 104 may be achieved using various protocols such as near-field communication (NFC), Bluetooth, Wi-Fi, etc.

At block 304, the system exchanges capability information between lens assembly 102 and camera 104. In various implementations, the capability information includes one or more functional features. For example, lens assembly 102 sends to camera 104 what functional features lens assembly 102 has to offer. This enables camera 104 to know what features of lens assembly 102 that camera 104 may take advantage of. Also, camera 104 sends to lens assembly 102 what functional features camera 104 has to offer. This enables lens assembly 102 to know what features of camera 104 that lens assembly 102 may take advantage of.

In various implementations, functional features may include an image focusing function, such as an enhance focus feature. In various implementations, functional features may include extended camera modes. In various implementations, functional features may include a motion stabilization function. Such a motion stabilization function enables the lenses of lens assembly 102 to communicate with camera body 104 to help steady an image to remove motion blur induced by camera movement or vibration. The control may also include control over lens features such as fine focus adjustments, F-stop control, focal length control for depth of field, macro focus, and zoom control, as well as other features associated with a camera lens such as stereo imagery, lens swivel control, correction for chromatic aberration, etc. Those features could be controlled through the user interface on the camera to allow the user to make selections as desired.

At block 306, the system matches one or more of the functional features that both lens assembly 102 has and that camera 104 has. If both lens assembly 102 and camera 104 have one or more of the same functional features (e.g., image zooming function, etc.), lens assembly 102 and camera 104 may cooperate to provide the image focusing function in order to provide high-quality images. For example, the camera may provide digital zoom while the lens provides physical zoom. The system determines such matches that will provide the best quality. In some implementations, depending on the camera mode, such matches or pairings are enabled or disabled as a default. Also, user selection may change the default values temporarily or permanently. In some cases, the lens may provide features such as special lens filters or lens flair suppression, which are not part of the camera. The device manufacturer would have a master list of features that exist on either a camera or a lens. In some cases, a feature may exist on one and not the other (e.g., on the camera and not on the lens assembly, or on the lens assembly and not on the camera). These features may be rated by the product manufacturer for "quality." For example, "digital zoom" would have a lower quality rating than the "physical zoom" of a good lens. In some implementations, the camera may accept the list of features from the lens and where these are higher quality than what the camera offers. The camera may use such features. In some implementations, there may also be a standard for how to represent a given feature in a user interface on the camera. In any case, the camera may present and control a set of features within the lens that may or may not exist within the camera itself.

At block 308, the system enables the lens assembly and the camera to cooperate in providing functional features based at least in part on the matching of one or more of the functional features. In various implementations, lens assembly 102 controls one or more functional features of the camera 104. In various implementations, the lens assembly enables the camera to control one or more functional features of the lens assembly. Camera 104 enables lens assembly 102 to control the matched functional features of camera 104. As an example, in some implementations, the camera may set the lens to have a narrow depth of focus and sample the light to determine the shutter speed needed to provide the best image quality. Both the camera and lens assembly work together toward a common goal of providing high quality images. In another example implementation, the lens has physical zoom while the camera has digital zoom. Physical zoom is selected by default, because it is better than digital zoom. In some implementations, the physical zoom of the lens may be combined with motion compensation on the camera to improve the quality of the image.

In some implementations, lens assembly 102 may provide camera 102 with sufficient capability information and metadata in order to enable camera 102 to generate a user interface that enables a user to interact and control various features of lens assembly 102.

In some implementations, the system may enable a user to override default settings for available features on either a temporary or permanent basis using the user interface. A menu selection in the user interface may also provide access to features, settings, and preferences associated with lens assembly 102, which may be controlled by camera 104. In situations where a similar feature is available on both the camera and the lens, such a physical zoom on the lens and digital zoom on the camera, the feature with the higher quality rating would be chosen by default. In a situation where a lens with a fixed zoom is attached to the camera, the digital zoom may be employed, as digital zoom is better than no zoom at all. In some implementations, in a case where there are no electronics within the lens assembly, the camera only uses the features it provides.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
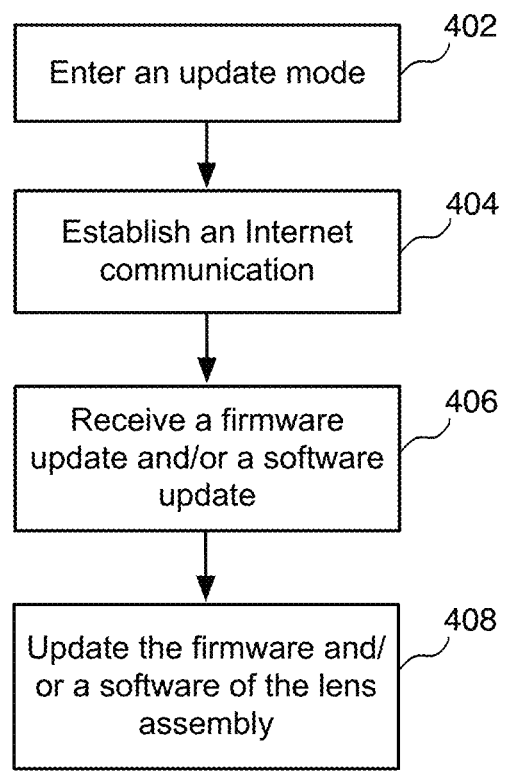
FIG. 4 illustrates an example flow diagram for performing updates, according to some implementations.

FIG. 4 illustrates an example flow diagram for performing updates, according to some implementations. While some example implementations are described in the context of updates to lens assembly 102, such implementations may also apply to camera 104. Referring to both FIGS. 2 and 4, a method is initiated at block 402, where the system enters an update mode.

At block 404, the system establishes an Internet communication. The system may then search for firmware and/or software updates to determine if they are available. If available, the system may check to see if lens assembly 102 has the latest version(s). If so, lens assembly 102 is up-to-date. If not, the system may then proceed to download the firmware and/or software update.

At block 406, the system receives a firmware update and/or a software update.

At block 408, the system updates the firmware and/or software of lens assembly 102.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations enable close interrelation and cooperation between a detachable lens assembly and a camera similar to that of a lens assembly that is integrated into a camera. Implementations described herein also enable simple and convenient updates to the firmware and/or software of a lens assembly.

Figure 5:
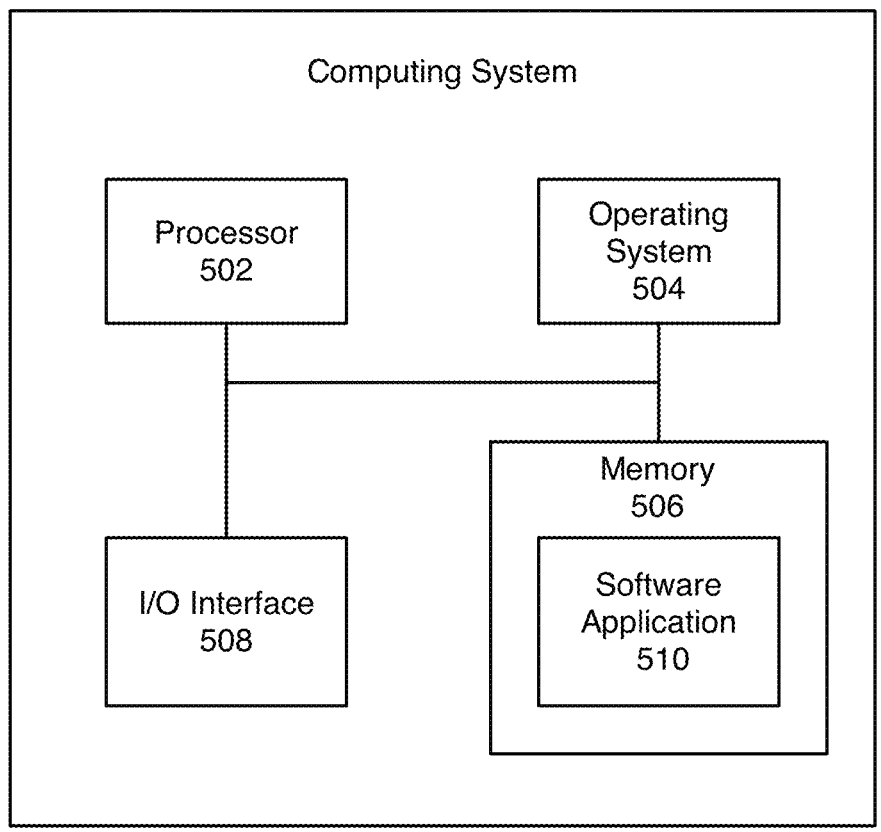
FIG. 5 illustrates a block diagram of an example computing system, which may be used for some implementations described herein.

FIG. 5 illustrates a block diagram of an example computing system 500, which may be used for some implementations described herein. For example, computing system 500 may be used to implement lens assembly 102 and/or may be used to implement camera 104, as well as to perform implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of computing system 500 or any suitable processor or processors associated with computing system 500 or any suitable system may perform the steps described. Implementations described herein may be carried out on a user device, on a server, or a combination of both.

Computing system 500 also includes a software application 510, which may be stored on memory 506 or on any other suitable storage location or computer-readable medium. Software application 510 provides instructions that enable processor 502 to perform the implementations described herein and other functions. Software application may also include an engine such as a network engine for performing various functions associated with one or more networks and network communications. The components of computing system 500 may be implemented by one or more processors or any combination of hardware devices, as well as any combination of hardware, software, firmware, etc.

For ease of illustration, FIG. 5 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   logic encoded in one or more non-transitory computer-readable storage media for execution by the one or more processors and when executed operable to cause the one or more processors to perform operations comprising:
   establishing electronic communication between a lens assembly and a camera, wherein the lens assembly is removably attached to the camera;
   exchanging capability information between the lens assembly and the camera, wherein the capability information includes one or more functional features;
   matching the one or more functional features between the lens assembly and the camera, wherein the matching comprises:

identifying one or more common functional features of the one or more functional features, wherein the one or more common functional features are functional features that both the lens assembly and the camera have; and identifying one or more unique functional features of the one or more functional features, wherein the one or more unique functional features are functional features that only one of the lens assembly and the camera has;

determining one or more quality ratings for the one or more functional features; and enabling the lens assembly and the camera to cooperate in providing functional features based at least in part on the one or more quality ratings.

2. The system of claim 1, wherein the logic when executed is further operable to cause the one or more processors to perform operations comprising establishing the electronic communication between the lens assembly and the camera wirelessly.

3. The system of claim 1, wherein the one or more functional features includes an image focusing function.

4. The system of claim 1, wherein the one or more functional features includes a motion stabilization function.

5. The system of claim 1, wherein the logic when executed is further operable to cause the one or more processors to perform operations comprising controlling, by the lens assembly, one or more of the functional features of the camera.

6. The system of claim 1, wherein the logic when executed is further operable to cause the one or more processors to perform operations comprising enabling, by the lens assembly, the camera to control one or more of the functional features of the lens assembly.

7. The system of claim 1, wherein the logic when executed is further operable to cause the one or more processors to perform operations comprising:
   entering an update mode;
   establishing an Internet communication; and
   receiving one or more of a firmware update and a software update.

8. The method of claim 1, further comprising establishing the electronic communication between the lens assembly and the camera wirelessly.

9. The method of claim 1, wherein the one or more functional features includes an image focusing function.

10. The method of claim 1, wherein the one or more functional features includes a motion stabilization function.

11. The method of claim 1, further comprising controlling, by the lens assembly, one or more of the functional features of the camera.

12. The method of claim 1, further comprising enabling, by the lens assembly, the camera to control one or more of the functional features of the lens assembly.

13. A non-transitory computer-readable storage medium with program instructions stored thereon, the program instructions when executed by one or more processors are operable to cause the one or more processors to perform operations comprising:
   establishing electronic communication between a lens assembly and a camera, wherein the lens assembly is removably attached to the camera;
   exchanging capability information between the lens assembly and the camera, wherein the capability information includes one or more functional features;
   matching the one or more functional features between the lens assembly and the camera, wherein the matching comprises:
     identifying one or more common functional features of the one or more functional features, wherein the one or more common functional features are functional features that both the lens assembly and the camera have; and
     identifying one or more unique functional features of the one or more functional features, wherein the one or more unique functional features are functional features that only one of the lens assembly and the camera has;
   determining one or more quality ratings for the one or more functional features; and
   enabling the lens assembly and the camera to cooperate in providing functional features based at least in part on the one or more quality ratings.

14. The computer-readable storage medium of claim 13, wherein the instructions when executed are further operable to cause the one or more processors to perform operations comprising establishing the electronic communication between the lens assembly and the camera wirelessly.

15. The computer-readable storage medium of claim 13, wherein the one or more functional features includes an image focusing function.

16. The computer-readable storage medium of claim 13, wherein the one or more functional features includes a motion stabilization function.

17. The computer-readable storage medium of claim 13, wherein the instructions when executed are further operable to cause the one or more processors to perform operations comprising controlling, by the lens assembly, one or more of the functional features of the camera.

18. The computer-readable storage medium of claim 13, wherein the instructions when executed are further operable to cause the one or more processors to perform operations comprising enabling, by the lens assembly, the camera to control one or more of the functional features of the lens assembly.

19. The computer-readable storage medium of claim 13, wherein the instructions when executed are further operable to cause the one or more processors to perform operations comprising:
   entering an update mode;
   establishing an Internet communication; and
   receiving one or more of a firmware update and a software update.

20. A computer-implemented method comprising:
   establishing electronic communication between a lens assembly and a camera, wherein the lens assembly is removably attached to the camera;
   exchanging capability information between the lens assembly and the camera, wherein the capability information includes one or more functional features;
   matching the one or more functional features between the lens assembly and the camera, wherein the matching comprises:
     identifying one or more common functional features of the one or more functional features, wherein the one or more common functional features are functional features that both the lens assembly and the camera have; and
     identifying one or more unique functional features of the one or more functional features, wherein the one or more unique functional features are functional features that only one of the lens assembly and the camera has;

determining one or more quality ratings for the one or more functional features; and enabling the lens assembly and the camera to cooperate in providing functional features based at least in part on the one or more quality ratings.

* * * * *